US006977279B1

(12) United States Patent
Tillack et al.

(10) Patent No.: US 6,977,279 B1
(45) Date of Patent: *Dec. 20, 2005

(54) SOLVENT-FREE ROOM TEMPERATURE CURING REACTIVE SYSTEMS AND THE USE THEREOF IN THE PRODUCTION OF ADHESIVES, SEALING AGENTS, CASTING COMPOUNDS, MOLDED ARTICLES OR COATINGS

(75) Inventors: Jörg Tillack, Bergisch Gladbach (DE); Wolfgang Puetz, Hünxe (DE); Lutz Schmalstieg, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 121 days.

This patent is subject to a terminal disclaimer.

(21) Appl. No.: 10/048,086

(22) PCT Filed: Jul. 17, 2000

(86) PCT No.: PCT/EP00/06801

§ 371 (c)(1),
(2), (4) Date: Mar. 5, 2002

(87) PCT Pub. No.: WO01/09219

PCT Pub. Date: Feb. 8, 2001

(30) Foreign Application Priority Data

Jul. 28, 1999 (DE) ............................... 199 35 325

(51) Int. Cl.$^7$ ....................... C08L 63/00; C08L 63/02; C08L 63/04; C08L 75/06; C08L 75/08
(52) U.S. Cl. ...................... 525/111; 525/404; 525/407; 525/438; 525/454; 525/502; 525/504; 525/526; 525/528; 525/525
(58) Field of Search ............................. 525/528, 404, 525/407, 438, 454, 486, 502, 504, 526, 111

(56) References Cited

U.S. PATENT DOCUMENTS

| | | | |
|---|---|---|---|
| 3,912,566 A | | 10/1975 | Andrews et al. ............. 156/330 |
| 3,993,708 A | | 11/1976 | Brinkmann et al. ...... 260/830 P |
| 4,001,232 A | * | 1/1977 | Groegler et al. ............. 544/242 |
| 4,753,826 A | * | 6/1988 | Lauman ....................... 427/386 |
| 4,908,408 A | * | 3/1990 | Boutillier et al. ............ 525/124 |
| 5,219,975 A | | 6/1993 | Schmalstieg et al. ......... 528/45 |
| 5,308,895 A | * | 5/1994 | Gan et al. .................... 523/445 |
| 6,060,574 A | * | 5/2000 | Schmalstieg et al. ......... 528/45 |
| 6,153,709 A | * | 11/2000 | Xiao et al. ................... 525/528 |
| 6,486,256 B1 | * | 11/2002 | Tarbutton et al. ............. 525/65 |

FOREIGN PATENT DOCUMENTS

| | | |
|---|---|---|
| CA | 1219986 | 3/1987 |
| DE | 21 52 606 | 4/1973 |
| DE | 30 23 202 | 1/1982 |
| EP | 0 159 488 | 10/1985 |
| EP | 0 082 983 | 4/1987 |
| EP | 0 293 110 | 11/1988 |
| EP | 0 688 803 | 12/1995 |
| EP | 0 950 675 | 10/1999 |
| GB | 1411485 | 10/1975 |
| JP | 50-117771 A2 * | 9/1975 |

* cited by examiner

*Primary Examiner*—Robert Sellers
(74) *Attorney, Agent, or Firm*—Joseph C. Gil; Thomas W. Roy

(57) ABSTRACT

The present invention relates to novel solventless reactive systems curable at room temperature, based on blocked polyisocyanates, primary amines, compounds with oxirane groups, and 2,3-dimethyl-3,4,5,6-tetrahydropyrimidine, and to processes for the preparation of these solventless reactive systems curable at room temperature.

20 Claims, No Drawings

SOLVENT-FREE ROOM TEMPERATURE CURING REACTIVE SYSTEMS AND THE USE THEREOF IN THE PRODUCTION OF ADHESIVES, SEALING AGENTS, CASTING COMPOUNDS, MOLDED ARTICLES OR COATINGS

BACKGROUND OF THE INVENTION

The present invention relates to novel solventless reactive systems curable at room temperature, based on blocked polyisocyanates, organic amine with at least two primary amino groups, compounds with oxirane groups, and 2,3-dimethyl-3,4,5,6-tetrahydropyrimidine, and to processes for the preparation of these solventless reactive systems curable at room temperature.

The present invention further relates to the use of these solventless reactive systems for the manufacture of adhesives, sealing compounds, casting compounds, mouldings or coatings, e.g. coatings for ballast tanks, curable at room temperature.

Polyamine/epoxy resin systems are distinguished inter alia by excellent adhesion to metal, very good chemical resistance and outstanding anticorrosive properties. In the case of solvent-containing formulations and powder coating systems, crosslinked films of high flexibility can be obtained by using epoxy resins of high molecular weight and/or polyaminoamides, e.g. based on dimeric fatty acids, as hardeners. Because of the low molecular weight of epoxy resins and the resulting high network density, coatings based on solventless liquid resins and solventless amine-type hardeners are brittle. Nowadays, therefore, solventless formulations are plasticized using e.g. tar substitutes like coumarone resins. Particularly when larger amounts of hydrocarbon resins are used, such coatings tend towards long-term brittleness as a result of migration of the non-functional constituents.

A good and lasting elasticization of epoxy resins can be achieved by combination with polyurethanes. Thus, in DE-A 2 338 256, for example, high-molecular amine-terminated polyetherurethane-ureas were prepared by reacting prepolymers containing free isocyanate groups with amines in highly dilute solutions and then hardened with epoxy resins.

The use of the solvents required for this purpose, especially aromatic solvents, is disadvantageous in practice from both technical and physiological points of view. On the other hand the viscosity of solventless reaction products, such as those specifically prepared according to DE-A 2 338 256, is too high for practical use.

DE-A 2 418 041 describes a process for the manufacture of elasticized mouldings and flat structures wherein epoxy compounds are reacted with amine compounds obtained by the hydrolysis of prepolymeric ketimines or enamines. Chemically resistant thermosets which adhere well and have improved properties can be prepared by this process.

However, the process described in said publication is elaborate in terms of process technology and hence expensive.

DE-A 2 152 606 describes reactive systems based on alkylphenol-blocked polyisocyanates and polyamines which can optionally also be hardened in combination with epoxy resins. These reactive systems again suffer from disadvantages in terms of application technology: On the one hand the reactive systems have a relatively high viscosity; on the other hand the blocking agent liberated is of comparatively low molecular weight and therefore migrates out of the coating over time, which can lead to adhesion problems. Moreover, the level of mechanical properties does not satisfy all the technical demands.

To facilitate a specific reaction of polyisocyanate prepolymers with excess amounts of diamine, it was therefore frequently proposed to use the polyisocyanates in blocked form, e.g. as described in CA-A 1 219 986, EP-A 293 110 or EP-A 82 983. A common feature of all these publications is that phenols or substituted phenols are used as the preferred blocking agents. After reaction with the polyamines, removal of these substances from the reaction mixture by distillation is impossible, or only partial, because of their high boiling point, but residues of the optionally substituted phenols in the mixture or in the plastic composition lead to the disadvantages already mentioned.

The last-mentioned publications do in fact indicate that, in principle, it is also possible to use the other blocking agents conventionally employed in polyurethane chemistry. Such blocking agents conventionally used in polyurethane chemistry are oximes, caprolactam, ethyl malonate and ethyl acetoacetate. As none of these blocking agents can be incorporated into the polymer skeleton during epoxy hardening, and such compounds are not normally used in conventional amine/epoxy chemistry, the use of such blocking agents in place of the preferred, optionally substituted phenols offers no great advantages.

By contrast, EP-A 457 089 uses secondary amines, preferably of low boiling point, as blocking agents. If these amines remain in the reaction mixture after deblocking, they easily create an odour nuisance. Although, after being introduced into epoxy systems, the secondary amine can in principle be incorporated into the system, this will happen relatively slowly, especially in the case of applications at low temperatures (e.g. room temperature), and part of the amines will escape.

In one particularly preferred application, the amine-type blocking agent is distilled out of the reaction mixture after deblocking. Although this procedure yields products which do not create an odour nuisance, it is very elaborate and hence expensive.

The object of the invention was therefore to provide reactive systems curable at room temperature, based on blocked polyisocyanates, polyamines and compounds with oxirane groups, which do not suffer from the disadvantages of the systems according to the state of the art.

SUMMARY OF THE INVENTION

The invention provides solventless reactive systems curable at room temperature and consisting of A) a polyisocyanate component consisting of at least one organic polyisocyanate in the molecular weight range 168 to 25,000 (excluding the blocking agent), whose NCO groups are reversibly blocked to the extent of at least 95 mol % by reaction with at least one hydrocarbon resin containing phenolic OH groups and having a hydroxyl group content, calculated as OH (molecular weight=17), of 0.1% to 10.0%, B) at least one organic amine with at least 2 primary amino groups, C) compounds with oxirane groups which contain on average more than one epoxy group per molecule, and D) 2,3-dimethyl-3,4,5,6-tetrahydropyrimidine of formula (I):

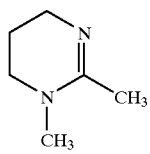

as catalyst.

The invention also provides the use of these solventless reactive systems curable at room temperature, optionally in combination with the auxiliary substances and additives conventionally employed in plastics and coating technology, for the manufacture of adhesives, sealing compounds, casting compounds, mouldings or coatings.

DETAILED DESCRIPTION OF THE INVENTION

The invention is based on the surprising observation that, in the presence of 2,3- dimethyl-3,4,5,6-tetrahydropyrimidine of formula (I) as catalyst, the reaction of epoxy resin/amine and blocked isocyanate/amine can be adjusted so that the solventless reactive systems according to the invention, curable at room temperature, produce a uniform film.

Suitable polyisocyanates for preparing of component A) are organic polyisocyanates or polyisocyanate mixtures with an (average) molecular weight, determined from the isocyanate content and the functionality, of 168 to 25,000, preferably 1000 to 12,000. Suitable starting polyisocyanates are the isocyanates known per se from polyurethane chemistry, such as hexamethylene diisocyanate, isophorone diisocyanate, dicyclohexylmethane diisocyanate, the isomeric diphenylmethane diisocyanates and their higher homologues such as those formed by the phosgenation of aniline/formaldehyde condensation products, 2,4- and 2,6-toluylene diisocyanate and technical-grade mixtures thereof. The secondary products of said isocyanates with a biuret, isocyanurate, iminooxadiazinedione, uretdione, allophanate and/or urethane structure, which are known per se, are also suitable.

The polyisocyanates for preparing the starting compounds A) are preferably prepolymers with isocyanate groups, such as those obtained in a manner known per se by reacting low-molecular or higher-molecular polyhydroxyl compounds with excess amounts of the above-mentioned di- or polyisocyanates or with a large excess of said di- and polyisocyanates, and then removing the excess polyisocyanate, e.g. by film distillation. The prepolymers are very particularly preferably synthesized using aromatic polyisocyanates in the molecular weight range 174 to 300. The prepolymers are generally prepared at 40 to 140° C., optionally with the concomitant use of catalysts known per se from polyurethane chemistry, examples being metal-organic compounds such as tin(II) octoate, dibutyltin(II) diacetate or dibutyltin(II) dilaurate, or tertiary amines such as triethylamine or diazabicyclooctane.

The following are suitable for preparing such prepolymers: low-molecular polyhydroxyl compounds in the molecular weight range 62 to 299, for example ethylene glycol, 1,3-propylene glycol, 1,4-butanediol, 1,6-hexanediol, neopentyl glycol, 2-ethyl-1,3-hexanediol, glycerol, trimethylolpropane and pentaerythritol, as well as low-molecular esters of such polyols with dicarboxylic acids of the type mentioned by way of example below, said esters containing hydroxyl groups, or low-molecular ethoxylation or propoxylation products of said simple polyols, or any desired mixtures of such modified or unmodified alcohols.

Preferably, however, the prepolymers are prepared using higher-molecular polyhydroxyl compounds in the molecular weight range 300 to 20,000, preferably 1000 to 8000, of the type known per se from polyurethane chemistry. Examples of higher-molecular polyhydroxyl compounds for preparing the prepolymers are polyesterpolyols corresponding to the details given and based on low-molecular simple alcohols of the type already mentioned as examples and polybasic carboxylic acids such as adipic acid, sebacic acid, phthalic acid, isophthalic acid, tetrahydrophthalic acid, hexahydrophthalic acid or maleic acid, the anhydrides of such acids or any desired mixtures of such acids or anhydrides. Polylactones containing hydroxyl groups and corresponding to the above details, especially poly-ε-caprolactones, are also suitable for preparing the prepolymers or semiprepolymers.

Other suitable compounds for preparing the prepolymers with isocyanate groups are polyetherpolyols corresponding to the above details and obtainable in a manner known per se by the alkoxylation of suitable starter molecules. Examples of suitable starter molecules are the simple polyols already mentioned above, water, organic polyamines having at least two N—H bonds, or any desired mixtures of such starter molecules. Alkylene oxides suitable for the alkoxylation reaction are especially ethylene oxide and/or propylene oxide, which can be used in the alkoxylation reaction in any desired order or in a mixture.

Other compounds suitable for preparing the prepolymers are polytetramethylene glycol polyethers corresponding to the details give above and obtainable in known manner by the cationic polymerization of tetrahydrofuran.

Other compounds suitable for preparing the prepolymers are polycarbonates with hydroxyl groups corresponding to the above details and preparable for example by reacting simple diols of the above-mentioned type with diaryl carbonates, such as diphenyl carbonate, or phosgene.

Other compounds suitable for preparing the prepolymers with NCO groups are polythioetherpolyols such as those obtainable for example by the polycondensation of thiodiglycol with itself or with diols and/or polyols of the type mentioned.

Other suitable compounds are polyacetals, e.g. polycondensation products of formaldehyde and diols or polyols of the type mentioned, such as those obtainable using acid catalysts like phosphoric acid or p-toluenesulfonic acid.

Of course, the prepolymers can also be prepared using mixtures of the hydroxyl compounds given as examples.

Particularly preferred polyisocyanates for preparing the starting compounds A) used in the process according to the invention are prepolymers based on aromatic polyisocyanates of the type mentioned above, e.g. 2,4- and/or 2,6-toluylene diisocyanate.

Hydrocarbon resins with phenolic OH groups which are suitable for preparing the blocked polyisocyanates used according to the invention as component A) are those of the generally known type, such as those described as examples in Ullmanns Encyklopädie der technischen Chemie (Ullmann's Encyclopaedia of Industrial Chemistry), 4th edition, vol. 12, pages 539 to 545 (Verlag Chemie, Weinheim 1976), Kirk-Othmer, Encyclopaedia of Chemical Technology, 3rd edition, vol. 12, pages 852 to 869 (John Wiley & Sons, New York 1980) or Encyclopaedia of Polymer Science and Engineering, vol. 7, pages 758 to 782 (John Wiley & Sons, New York 1987). Examples of suitable hydrocarbon resins with phenolic OH groups are coumarone-indene resins, petroleum resins or terpene resins.

Such hydrocarbon resins with phenolic OH groups are typically prepared by the copolymerization of unsaturated hydrocarbons of the type mentioned below with phenol in the presence of strong acids or catalysts of the Friedel-Crafts type. Suitable unsaturated hydrocarbons for preparing the OH-functional hydrocarbon resins usable according to the invention are the hydrocarbons obtained from the cracking of naphtha or gas oil, for example butene, butadiene, pentene, piperylene, isoprene, cyclopentadiene, styrene, α-methylstyrene, vinyltoluene, dicyclopentadiene, methyldicyclopentadiene, indene and methylindene. Other unsaturated hydrocarbons suitable for preparing the OH-functional hydrocarbon resins usable according to the invention are terpene resins, for example α-pinene, β-pinene, dipentene, D-limonene or turpentine. Hydrocarbon resins which can be used have a hydroxyl group content, calculated as OH (molecular weight=17), of 0.1% to 10.0% and preferably a hydroxyl group content of 1.0% to 6.0%. It is particularly preferred to prepare component A) using hydrocarbon resins which are liquid at room temperature and have a hydroxyl group content of 1.5% to 4.0%.

The polyisocyanates suitable according to the invention as component A) and containing reversibly blocked isocyanate groups are prepared by reacting organic polyisocyanates of the above-mentioned type, at temperatures of 40° C. to 150° C., preferably at 50° C. to 100° C., with hydrocarbon resins containing phenolic OH groups, characterized in greater detail above. The amount of hydrocarbon resin with phenolic OH groups used in the blocking reaction should correspond to at least 95 mol % of the amount of NCO groups to be blocked. A small excess of blocking agent may be expedient to ensure that all the isocyanate groups react completely. As a rule the excess is not more than 20 mol %, preferably not more than 15 mol % and particularly preferably not more than 10 mol %, based on the isocyanate groups to be blocked. The blocking reaction is preferably carried out with the concomitant use of catalysts known per se from polyurethane chemistry, examples being metal-organic compounds such as tin(II) octoate, dibutyltin(II) diacetate or dibutyltin(II) dilaurate, or tertiary amines such as triethylamine or diazabicyclooctane. The blocking reaction can optionally be carried out in the presence of conventional inert solvents or coating solvents, for example ethyl acetate, butyl acetate, methoxypropyl acetate, methyl ethyl ketone, methyl isobutyl ketone, toluene, xylene, aromatic or (cyclo)aliphatic hydrocarbon mixtures, or any desired mixtures of such solvents. These solvents or coating solvents are then separated off after the synthesis, e.g. by distillation, to give solventless reactive systems. These reactions are preferably carried out without a solvent.

Component B) of the solventless reactive systems according to the invention, curable at room temperature, consists of polyamines containing at least two primary amino groups per molecule, and optionally also secondary amino groups, and preferably having an (average) molecular weight of 60 to 500. Suitable examples are ethylenediamine, 1,2- and 1,3-diaminopropane, 1,4-diaminobutane, 1,6-diaminohexane, 2,2,4- and/or 2,4,4-trimethylhexamethylenediamine, the isomeric xylylenediamines, 1,4-diaminocyclohexane, 4,4'-diaminodicyclohexylmethane, 1,3-diaminocyclopentane, 4,4'-diaminodicyclohexyl sulfone, 1,3-(4,4'-diaminodicyclohexyl)propane, 2,2-(4,4'-diaminodicyclohexyl)propane, 3,3'-dimethyl-4,4'-diaminodicyclohexylmethane, 3-aminomethyl-3,3,5-trimethylcyclohexylamine (isophoronediamine), 3(4)-aminomethyl-1-methylcyclohexylamine or technical-grade bisaminomethyltricyclodecane (TCD-diamine), and also polyamines containing secondary amino groups in addition to at least two primary amino groups, for example diethylenetriamine or triethylenetetramine.

It is particularly preferred to use polyamines, especially diamines, in said molecular weight range which have one or more cycloaliphatic rings. These include e.g. 1,4-diaminocyclohexane, 4,4'-diaminodicyclohexylmethane, 1,3-diaminocyclopentane, 4,4'-diaminodicyclohexyl sulfone, 1,3-(4,4'-diaminodicyclohexyl)propane, 2,2-(4,4'-diaminodicyclohexyl)propane, 3,3'-dimethyl-4,4'-diaminodicyclohexylmethane, 3-aminomethyl-3,3,5-trimethylcyclohexylamine (isophoronediamine), 3(4)-aminomethyl-1-methylcyclohexylamine or technical-grade bisaminomethyltricyclodecane.

Adducts prepared by reacting an excess of said polyamines with epoxy resins of the type mentioned below can also be used as component B).

Polyetheramines prepared by reacting polyetherpolyols with ammonia, for example those marketed by Huntsman under the trade name Jeffamin®, can also be used as component B).

Furthermore, polyamide resins are also suitable as component B). Such polyamide resins, which include polyaminoamides and polyaminoimidazolines, are marketed inter alia by Henkel under the trade name "Versamid®".

Of course, it is also possible to use mixtures of said polyamines as component B).

Component C) consists of compounds with oxirane groups. Suitable compounds with oxirane groups are epoxy resins containing on average more than one epoxy group per molecule. Examples of suitable epoxy resins are glycidyl ethers of polyhydric alcohols such as butanediol, hexanediol, glycerol or hydrogenated diphenylolpropane, or of polyhydric phenols such as resorcinol, 2,2-diphenylolpropane (bisphenol A), diphenylolmethane (bisphenol F) or phenol/aldehyde condensation products. It is also possible to use glycidyl esters of polybasic carboxylic acids such as hexahydrophthalic acid or a dimerized fatty acid.

It is particularly preferred to use liquid epoxy resins based on epichlorohydrin and 2,2-diphenylolpropane (bisphenol A) or diphenylolmethane (bisphenol F), or mixtures thereof. If desired, it is possible to lower the viscosity of the mixtures with monofunctional epoxy compounds and thereby improve the processing. Examples of said monofunctional epoxy compounds are aliphatic and aromatic glycidyl ethers such as butyl glycidyl ether or phenyl glycidyl ether, glycidyl esters such as versatic acid glycidyl ester, or epoxides such as styrene oxide or 1,2-epoxydodecane.

Component D) is 2,3-dimethyl-3,4,5,6-tetrahydropyrimidine of formula (I):

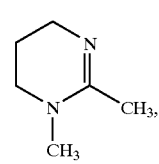

(I)

which can be prepared e.g. according to the teaching of DE-A 2 439 550 by reacting N-methyl-1,3-propanediamine with acetoacetic acid derivatives. It serves as a catalyst and is preferably used in amounts of up to 5 wt. %, particularly preferably in amounts of 0.5 to 3 wt. % and very particularly preferably in amounts of 0.7 to 1.5 wt. %, based on the sum of components A) and C).

To prepare the ready-to-use mixtures, component D) is normally added to component B). If component C) is present, components A) and C) can preferably be added together. Furthermore, the conventional auxiliary substances and additives, for example fillers, flow control agents, pigments, solvents, reaction accelerators or viscosity regulators, can be added to components A), C) or mixtures of A)+C) and B)+D). Examples which may be mentioned are reaction accelerators such as salicylic acid, bis(dimethylaminomethyl)phenol or tris(dimethylaminomethyl)phenol, fillers such as sand, crushed rock, silicic acid, powdered asbestos, kaolin, talcum, powdered metal (e.g. Fe), tar, tar pitch, asphalt, granulated cork or polyamide, plasticizers such as phthalic acid esters, or other viscosity regulators such as benzyl alcohol.

If the application requires it, the necessary amount of diluent can of course also be added to the solventless coating systems according to the invention.

The solventless reactive systems according to the invention, curable at room temperature, are suitable for the manufacture of coatings, adhesives, sealing compounds, casting compounds or mouldings in all areas of application which demand good adhesion, chemical resistance, high impact strength and high shock resistance, combined with good flexibility and elasticity. The systems according to the invention are particularly suitable as anticorrosive coatings. Particularly when subjected to aggressive media, for example when used to coat ballast tanks, the systems are distinguished by good wet adhesion and good adhesion under conditions of cathodic protection.

An essential feature of the invention here is that only with the help of 2,3-dimethyl-3,4,5,6-tetrahydropyrimidine as catalyst can the reaction of epoxy resin/amine and blocked isocyanate/amine be adjusted so that the solventless reactive systems according to the invention, curable at room temperature, produce e.g. a uniform film at RT.

EXAMPLES

All percentages are by weight, unless indicated otherwise.

Example 1

1330 g of a polyetherpolyol of OH number 42, prepared by the simultaneous ethoxylation and propoxylation (EO/PO ratio=2:8) of a 2:1 mixture of propylene glycol and glycerol, are prepolymerized with 174 g of 2,4-diisocyanatotoluene for 5 hours at 80° C. until the theoretical NCO content of 2.8% has been reached.

800 g of a commercially available hydrocarbon resin with a hydroxyl group content of 2.25% (Novares LA 700, commercial product from VFT AG, Duisburg) are then added, 0.2 g of tin(II) octoate is added as catalyst and the mixture is stirred at 60° C. for 10 hours, after which time free isocyanate is no longer detectable in the IR spectrum. The blocked isocyanate prepolymer obtained has the following characteristics:
blocked NCO content: 1.8%
viscosity (23° C.): 62,000 mPa·s Example 2

The NCO prepolymer is prepared as described in Example 1. The blocking reaction is carried out analogously except that 940 g of a different commercially available hydrocarbon resin with a hydroxyl group content of 1.9% (Novares LA 300, commercial product from VFT AG, Duisburg) are used. The blocked isocyanate prepolymer obtained has the following characteristics:
blocked NCO content: 1.7%
viscosity (23° C.): 35,000 mPa·s Example 3

381.3 g of a polyetherpolyol of functionality 2.6 and OH number 43, prepared by the simultaneous ethoxylation and propoxylation (EO/PO ratio=2:8) of a 2:1 mixture of propylene glycol and glycerol, and 845.6 g of a polyetherdiol of OH number 29, prepared by the propoxylation of propylene glycol and subsequent ethoxylation (EO/PO ratio=2:8), are prepolymerized with 126.8 g of 2,4-diisocyanatotoluene at 60–65° C., after the addition of 0.07 g of 2-chloropropionic acid, until the theoretical NCO content of 2.3% has been reached.

645.9 g of a commercially available hydrocarbon resin with an OH content of 1.8% (Necirès EPX L2®, commercial product from Nevcin Polymers B.V., Uithoom, Holland) are then added, 0.4 g of tin(II) octoate is added as catalyst and the mixture is stirred at 70–80° C. until the NCO content falls below 0.2%.
blocked NCO content: 1.5%
viscosity (23° C.): 24,400 mPa·s Examples 4–45

In these Examples, Epikote® 828, a commercial product from Shell with an epoxy equivalent weight of 190, as a standard epoxy resin, and an adduct based on isophoronediamine/epoxy resin with an amine value of 6.5 eq/kg (HY 847® hardener, commercial product from Ciba Specialty Chemicals), as a commercially available polyamine hardener, were mixed with the blocked isocyanate prepolymers of Examples 1–3 and with the catalyst, and the mixture was cast onto a lid to a depth of approx. 3 mm.

The mixing ratio EP resin/blocked NCO prepo/polyamine was 60/40/24 in parts by weight. The catalyst concentration was 1%, based on components A) and C).

The compatibility was determined by the haze of the mouldings hardened overnight at room temperature.

It is easily seen that only with the help of 2,3-dimethyl-3,4,5,6-tetrahydropyrimidine as catalyst can the reaction of epoxy resin with amine and blocked isocyanate with amine be adjusted so that the solventless reactive systems according to the invention produce clear mouldings on drying at room temperature overnight.

| Name | NCO prepo of Ex. 1 | NCO prepo of Ex. 2 | NCO prepo of Ex. 3 |
| --- | --- | --- | --- |
| Example[1] | 4 | 5 | 6 |
| 2-methyl-2-azanorbornane | hazy | hazy | hazy |
| Example[1] | 7 | 8 | 9 |
| 1,4-diazabicyclo[2.2.2]octane | hazy | hazy | hazy |
| Example[1] | 10 | 11 | 12 |
| N-cocomorpholine | hazy | hazy | hazy |
| Example[1] | 13 | 14 | 15 |
| dimethylcyclohexylamine | hazy | hazy | hazy |
| Example[1] | 16 | 17 | 18 |
| dibutyltin dilaurate | hazy | hazy | hazy |
| Example[1] | 19 | 20 | 21 |
| Tin octoate | hazy | hazy | hazy |
| Example[2] | 22 | 23 | 24 |
| triethylamine | hazy | hazy | hazy |
| Example[2] | 25 | 26 | 27 |
| N,N-dimethylcyclohexylamine | hazy | hazy | hazy |
| Example[2] | 28 | 29 | 30 |
| triethylenediamine in dipropylene glycol | hazy | hazy | hazy |
| Example[2] | 31 | 32 | 33 |
| 4-methylmorpholine | hazy | hazy | hazy |

-continued

| Name | NCO prepo of Ex. 1 | NCO prepo of Ex. 2 | NCO prepo of Ex. 3 |
|---|---|---|---|
| Example[2] 1-methylimidazole | 34 hazy | 35 hazy | 36 hazy |
| Example[2] dimethylbenzylamine | 37 hazy | 38 hazy | 39 hazy |
| Example[2] 1,8-diazabicyclo[5.4.0]undec-7-ene | 40 hazy | 41 hazy | 42 hazy |
| Example[3] 2,3-dimethyl-3,4,5,6-tetrahydropyrimidine | 43 clear | 44 clear | 45 clear |

Source of supply:
[1] Air Products and Chemicals, Inc.
[2] BASF AG
[3] according to DE-A 2 439 550

What is claimed is:

1. A solventless reactive system, which is curable at room temperature and which comprises
    A) a polyisocyanate component comprising at least one organic polyisocyanate having a molecular weight, excluding the weight of the blocking agent, of 168 to 25,000 and in which at least 95 mole % of the NCO groups are reversibly blocked with at least one hydrocarbon resin containing phenolic OH groups and having an OH content of 0.1% to 10.0%, based on the weight of the hydrocarbon resin, wherein the hydrocarbon resin is prepared by copolymerizing phenol in the presence of strong acids or catalysts with one or more unsaturated hydrocarbons selected from the group consisting of butene, butadiene, pentene, piperylene, isoprene, cyclopentadiene, styrene, α-methylstyrene, vinyltoluene, dicyclopentadiene, methyldicyclopentadiene, indene and methylindene,
    B) at least one organic amine having at least 2 primary amino groups,
    C) an oxirane compound containing more than one epoxy group per molecule and
    D) a catalyst comprising 2,3-dimethyl-3,4,5,6-tetrahydropyrimidine of formula (I):

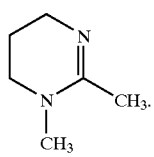

(I)

2. The solventless reactive system of claim 1 wherein said organic polyisocyanate comprises an isocyanate group-containing prepolymer prepared by reacting (i) an aromatic polyisocyanate having a molecular weight of 174 to 300 and (ii) an ether and/or ester group-containing organic polyhydroxyl compound having a molecular weight of 1000 to 8000, in which the isocyanate groups are reversibly blocked by reaction with at least one phenolic OH group-containing hydrocarbon resin having a hydroxyl group content of 0.1% to 10.0% based on the weight of the hydrocarbon resin.

3. The solventless reactive system of claim 1 wherein the isocyanate groups of component A) are reversibly blocked by reaction with a hydrocarbon resin which contains phenolic OH groups, is liquid at room temperature and has a hydroxyl group content of 1.5% to 4.0% based on the weight of the hydrocarbon resin.

4. The solventless reactive system of claim 2 wherein the isocyanate groups of component A) are reversibly blocked by reaction with a hydrocarbon resin which contains phenolic OH groups, is liquid at room temperature and has a hydroxyl group content of 1.5% to 4.0% based on the weight of the hydrocarbon resin.

5. The solventless reactive system of claim 1 wherein component B) comprises at least one diamine containing at least one cycloaliphatic ring and having a maximum molecular weight of 500.

6. The solventless reactive system of claim 2 wherein component B) comprises at least one diamine containing at least one cycloaliphatic ring and having a maximum molecular weight of 500.

7. The solventless reactive system of claim 3 wherein component B) comprises at least one diamine containing at least one cycloaliphatic ring and having a maximum molecular weight of 500.

8. The solventless reactive system of claim 4 wherein component B) comprises at least one diamine containing at least one cycloaliphatic ring and having a maximum molecular weight of 500.

9. The solventless reactive system of claim 1 wherein component C) comprises a liquid epoxy resin that is the reaction product of epichlorohydrin and 2,2-diphenylolpropane (bisphenol A) or diphenylolmethane (bisphenol F).

10. The solventless reactive system of claim 2 wherein component C) comprises a liquid epoxy resin that is the reaction product of epichlorohydrin and 2,2-diphenylolpropane (bisphenol A) or diphenylolmethane (bisphenol F).

11. The solventless reactive system of claim 3 wherein component C) comprises a liquid epoxy resin that is the reaction product of epichlorohydrin and 2,2-diphenylolpropane (bisphenol A) or diphenylolmethane (bisphenol F).

12. The solventless reactive system of claim 4 wherein component C) comprises a liquid epoxy resin that is the reaction product of epichlorohydrin and 2,2-diphenylolpropane (bisphenol A) or diphenylolmethane (bisphenol F).

13. The solventless reactive system of claim 5 wherein component C) comprises a liquid epoxy resin that is the reaction product of epichlorohydrin and 2,2-diphenylolpropane (bisphenol A) or diphenylolmethane (bisphenol F).

14. The solventless reactive system of claim 6 wherein component C) comprises a liquid epoxy resin that is the reaction product of epichlorohydrin and 2,2-diphenylolpropane (bisphenol A) or diphenylolmethane (bisphenol F).

15. The solventless reactive system of claim 7 wherein component C) comprises a liquid epoxy resin that is the reaction product of epichlorohydrin and 2,2-diphenylolpropane (bisphenol A) or diphenylolmethane (bisphenol F).

16. The solventless reactive system of claim 8 wherein component C) comprises a liquid epoxy resin that is the reaction product of epichlorohydrin and 2,2-diphenylolpropane (bisphenol A) or diphenylolmethane (bisphenol F).

17. The solventless reactive system of claim 1 wherein component D) is used in an amount of 0.5 to 3 wt. %, based on the weight of components A) and C).

18. The solventless reactive system of claim 16 wherein component D) is used in an amount of 0.5 to 3 wt. %, based on the weight of components A) and C).

19. An adhesive, sealant, casting compound, molded article or coating prepared from the solventless reactive system of claim 1.

20. A coating prepared from the solventless reactive system of claim 1.

* * * * *